Patented Feb. 6, 1951

2,541,006

UNITED STATES PATENT OFFICE 2,541,006

MODIFIED PETROLEUM SULFONATES AS EMULSIFYING AGENTS FOR WAXES

Rotheus B. Porter, Jr., Darien, and Edward J. Campbell, Stamford, Conn., assignors to American Cyanamid Company, New York, N. Y., a corporation of Maine No Drawing. Application November 18, 1947, Serial No. 786,798

6 Claims. (Cl. 252—318)

This invention relates to stable fluid wax emulsions of high solids content and more particularly, to an emulsifier suitable for use in the preparation of stable fluid wax emulsions of high solids content.

Emulsions of water-immiscible solid materials are usually prepared with the aid of a soap or other substance possessing similar properties. The solid materials may be emulsified in the form of a melt or they may first be dissolved in a suitable solvent.

In the past, one of the most commonly used types of emulsifying agent for water-immiscible solids has been the oil-soluble water-dispersible organic sulfonate type known as petroleum sulfonates or white oil soaps which are produced as a by-product in the refining of petroleum distillates with sulfuric acid. Use of these sulfonates as emulsifying agents, however, has not been without disadvantage. In the first place, mixtures of water-immiscible solids with petroleum sulfonates do not emulsify merely upon addition of water but rather require considerable agitation, and extreme care must be taken with regard to such factors as temperature, speed and type of agitation, and rate of water addition. Secondly, the petroleum sulfonate tends to separate out from the mixture to be emulsified, the mount of separation depending upon the time and temperature at which the mixture stands, and a non-uniform mix results. Finally, an emulsion obtained from a mixture of water-immiscible solid and petroleum sulfonate is not stable or permanent, but tends to separate or "cream" fairly rapidly irrespective of small particle size. It is therefore impossible to store a finished emulsion for any reasonable length of time.

Still another disadvantage resides in the use of petroleum sulfonates as emulsifying agents for water-immiscible solids, this disadvantage becoming apparent during the actual emulsification of the emulsifier mixture. Generally, this is accomplished by addition of water to the emulsifier mixture to produce a water-in-oil emulsion and continuing the addition until the emulsion inverts to an oil-in-water. In the past, it has not been possible to effect this inversion at high solids content so that emulsions of low solids content, i. e., 30% or less, were obtained. Moreover, regardless of the manner of emulsification, emulsions of higher solids content were unstable.

We have found, according to the present invention, that all the disadvantages discussed above may be overcome by suitable modification of the petroleum sulfonate and emulsifying agent.

It is an object of the present invention to provide a modified petroleum sulfonate suitable for use as an emulsifying agent in the preparation of stable fluid wax emulsions of high solids content.

Another object of the present invention is the modification of a petroleum sulfonate emulsifying agent with a material or materials which will permit inversion of a water-in-oil emulsion of an immiscible solid at high solids content.

Still another object of the present invention is the modification of a petroleum sulfonate emulsifying agent in such a manner that a mixture of the modified emulsifying agent and a water-immiscible solid may be emulsified to produce a stable fluid emulsion of high solids content.

Another object of the present invention is the preparation of a solid wax-emulsifier composition which is stable and uniform.

Still another object of the present invention is the production of a solid wax-emulsifier composition in which no separation of the emulsifier occurs.

A further object of the present invention is the preparation of a stable fluid wax emulsion of high solids content.

It is another object of the present invention to prepare a stable fluid wax emulsion of high solids content by mere simple addition of water to a wax-emulsifier composition.

Still another object of the present invention is the preparation of stable fluid wax emulsions of high solids content without the aid of homogenizing equipment.

It is still another object of the present invention to provide a wax emulsion of high solids content which shows no creaming upon standing.

A further object of the present invention is to prepare an emulsifiable wax composition suitable for use in the paper, textile, and similar industries.

The above and other objects are attained by modifying an emulsifying agent of the petroleum sulfonate type with a vegetable wax, or with a vegetable wax and a higher fatty acid.

The invention will be described in greater detail in conjunction with the following specific examples, in which proportions are given in parts by weight. It should be understood that the examples are merely illustrative and are not intended to be restrictive of the scope of the invention.

EXAMPLE 1

(1) 300 parts of scale wax
(2) 3.5 parts of water
(3) 35 parts of white oil soap
(4) 5 parts of oleic acid
(5) 10 parts of candelilla wax (crude)

Ingredients (1), (3), (4), and (5) are heated together with slow agitation to 70° C. The mix is allowed to cool slowly with continuous stirring until a temperature of 65° C. is reached. At this point (2) is added, the addition of which causes the mix to become brilliantly clear. When the mass has cooled to about 56° C., it is poured into suitable containers and allowed to solidify.

*Preparation of emulsion*

The solid wax-emulsifier mixture prepared as described above is heated to about 80° C. and 350 parts of water at the same temperature is slowly added with stirring. After about 10% by weight of the water has been taken up with no change in general appearance, the mix becomes opalescent and finally an oil-in-water emulsion is formed. About 45% of the total water is required to invert the emulsion, this inversion taking place when the emulsion contains about 70% solids. After inversion, the remainder of the water to make a 50% emulsion is added rapidly. The emulsion so obtained is completely fluid and stable.

EXAMPLE 2

(1) 60 parts of scale wax
(2) 0.7 part of water
(3) 6 parts of white oil soap
(4) 2 parts of oleic acid
(5) 2 parts of candelilla wax (crude)

The procedure of Example 1 is followed to prepare a solid wax-emulsifier mixture which is combined with 70 parts of water, also according to the procedure of Example 1, to form a completely fluid and stable oil-in-water emulsion.

EXAMPLE 3

(1) 60 parts of scale wax
(2) 0.7 part of water
(3) 5.5 parts of white oil soap
(4) 2.5 parts of oleic acid
(5) 2 parts of candelilla wax (crude)

A solid wax-emulsifier mixture is prepared as in Example 1. Blending with 70 parts of water in accordance with the description in Example 1 produces a completely fluid and stable oil-in-water emulsion.

EXAMPLE 4

(1) 60 parts of scale wax
(2) 0.7 part of water
(3) 8 parts of white oil soap
(4) 2 parts of carnauba wax Following the procedure of Example 1, a completely fluid and stable oil-in-water emulsion is obtained.

*Comparative Experiment A*

The wax-emulsifier composition of Example 1 and the emulsion prepared therefrom are compared with the following:

(1) A solid paraffin wax-emulsifier mixture containing 85% by weight scale wax and 15% by weight petroleum sulfonate.

(2) An emulsion prepared by melting (1) at about 90° C. and slowly adding water at the same temperature. An invert or water-in-oil emulsion is first formed but, as additional water is added, the emulsion assumes a heavy consistency and when the water content reaches about 60% the emulsion changes to one of the oil-in-water type, after which it may be diluted to the desired concentration. The maximum solids concentration which will result in a fluid emulsion is about 30%.

Properties of the various emulsions and wax-emulsifier mixtures compare as follows:

| Property | Ex. 1 Emulsifier Mixture | (1) | Ex. 1 Emulsion | (2) |
|---|---|---|---|---|
| General Appearance | light, hard, dry | dark, soft, oily | | |
| Uniformity | uniform, no separation of emulsifier. | non-uniform separation of emulsifier. | | |
| Solids Content | | | 50% | 20%. |
| Particle Size (microns): | | | | |
| Range | | | 0.2-2 | 0.2-4. |
| Bulk | | | 0.8-1.0 | 1.0. |
| Remarks | | | spherically shaped particles. | irregularly shaped particles. |
| Stability: Aging | | | no creaming | creaming. |

EXAMPLE 5

(1) 60 parts crude paraffin wax (M. P. 120°–124° F.)
(2) 6 parts petroleum sulfonate
(3) 2.0 parts carnauba wax
(4) 2 parts oleic acid (1), (2), (3), and (4) are heated to 70°–80° C., thoroughly blended, and allowed to solidify.

*Preparation of emulsion*

The solid wax-emulsifier composition prepared as described above is heated to 60° C. and water at the same temperature is added thereto to produce a stable emulsion containing 40% water.

EXAMPLE 6

30 parts crude paraffin wax (M. P. 120°–124° F.)
30 parts microcrystalline wax
4 parts montan wax
6 parts petroleum sulfonate The procedures of Example 5 are followed and a stable emulsion is obtained.

EXAMPLE 7

48 parts crude paraffin wax (M. P. 120°–124° F.)
12 parts ester gum
7 parts petroleum sulfonate
1 part stearic acid
2 parts candelilla wax The procedure of Example 5 are followed and a stable emulsion is obtained.

As will be evident from the details of the specific examples, no homogenizing equipment is necessary for the preparation of stable fluid wax emulsions from our new solid wax-emulsifier mixtures, and this constitutes an advantage of the present invention, since previously fluid emulsions of only about 30% solids content or less were obtainable without homogenizing equipment. In general, a mixture of wax and the modified emulsifier of the present invention is heated to a molten condition, and water at an elevated temperature is slowly added with agitation to the molten mixture. The amount of water added varies with the composition of the emulsifier, but in most cases is equal to the weight of the emulsifier-wax mixture. The emulsion is then either cooled rapidly or allowed to cool slowly, the rate of cooling appearing to have little effect on the stability of the final emulsion.

In general, the optimum formula for our wax-emulsifier composition is as follows:

| Material: | Per cent by weight |
|---|---|
| Scale wax | 85.0 |
| Candelilla wax | 2.5 |
| Petroleum sulfonates | 10.0 |
| Oleic acid | 1.5 |
| Water | 1.0 |

However, the invention is, of course, not limited to the optimum formula either as to specific material or as to specific proportions thereof. In general, we prefer to combine the emulsifier and material to be emulsified in relative proportions by weight of 1:6. In order that a concentrated fluid emulsion be obtained, the proportion of wax to be emulsified may not be increased beyond a 1:7 proportion by weight, emulsifier to wax. Obviously, less wax may be used than 6 parts by weight to 1 part by weight of emulsifier, but as the amount of emulsifiable material decreases, the commercial practical value of the final emulsion decreases although its properties of fluidity and high solids content are retained.

The composition of the emulsifier which constitutes one-seventh of the weight of our preferred emulsifiable composition may vary within certain limits. It should contain from 50%–80% petroleum sulfonate, from 0%–25% fatty acid, and from 15%–40% vegetable wax, the quantities of the three type ingredients being based on the total weight of the emulsifier composition. Expressed in somewhat different terms, the petroleum sulfonate is, according to the present invention, modified with from about 15% to 80% of its weight of vegetable wax and with from about 0% to 50% of its weight of fatty acid.

The present invention is applicable to the preparation of emulsifiers suitable for use in the preparation of wax emulsions generally, and is not to be construed as limited to emulsions of the paraffin or scale wax of the specific examples. Thus, stable emulsions of mineral waxes such as ozocerite, paraffin waxes such as slack wax, scale wax, refined paraffin, vegetable waxes such as carnauba wax, montan wax, candelilla wax, and the like may be prepared according to the present invention. Moreover, the present invention is also applicable to mixtures of any number of different waxes of the above types and to blends of the waxes with resinous materials such as ester gum, terpene resins, and the like.

The emulsifying agent may be any one or more of the oil-soluble alkali metal salts of sulfonic acids produced in the refining of petroleum distillates with fuming sulfuric acid. The oil-soluble alkali metal salts of sulfonic acids thus produced are known as while oil soaps or petroleum sulfonates.

The vegetable wax, the presence of which in the compositions of the present invention is a critical feature of the invention, may be any vegetable wax such as, for example, carnauba wax, montan wax, candelilla wax, ouricuri wax, cotton wax, sugar cane wax, and the like. Mixtures or blends of any number of different vegetable waxes may also be used.

Higher fatty acids which are suitable for use in the composition of the present invention are those which contain from 12 to 18 carbon atoms. These may be saturated or unsaturated acids. Examples include oleic acid, stearic acid, lauric acid, margaric acid, myristic acid, palmitic acid, linoleic acid, linolenic acid, etc. Obviously, mixtures of any number of different fatty acids of the above type may also be used.

The wax-emulsifier mixtures of the present invention may be used in the preparation of stable fluid paraffin wax emulsions of high solids concentration suitable for use in the sizing of paper, textiles, and similar fibrous materials in order to impart water-repellant properties thereto.

What is claimed is:

1. A solid wax-emulsifier mixture capable of producing a stable fluid wax emulsion of high solids content which comprises (1) a water-immiscible solid wax and (2) an emulsifier consisting of from 50% to 80% of an oil-soluble, water-dispersible petroleum sulfonate, from 15% to 40% of a vegetable wax and from 0% to 25% of a fatty acid containing from 12 to 18 carbon atoms, the above percentages being based on the total weight of emulsifier, (1) and (2) being present in relative proportions by weight of 6:1 to 7:1, respectively.

2. A mixture according to claim 1 wherein the water-immiscible solid wax is a vegetable wax.

3. A mixture according to claim 1 wherein the water-immiscible solid wax is a mineral wax.

4. A solid wax-emulsifier mixture capable of producing a stable fluid wax emulsion of high solids content which comprises 85% scale wax, 10% petroleum sulfonates, 2.5% candelilla wax, and 1.5% oleic acid, the percentages being based on total weight of said mixture.

5. A solid wax-emulsifier mixture capable of producing a stable fluid wax emulsion of high solids content which comprises 85% scale wax, 10% petroleum sulfonates, and 2.8% carnauba wax, the percentages being based on total weight of said mixture.

6. A solid wax-emulsifier mixture capable of producing a stable fluid wax emulsion of high solids content which comprises 69% paraffin wax, 17% ester gum, 10% petroleum sulfonates, 2.9% candelilla wax and 1.4% stearic acid, the percentages being based on total weight of said mixture.

ROTHEUS B. PORTER, Jr.
EDWARD J. CAMPBELL.

REFERENCES CITED

The following references are of record in the file of this patent:

UNITED STATES PATENTS

| Number | Name | Date |
|---|---|---|
| 1,795,993 | Bransky | Mar. 10, 1931 |
| 1,976,780 | Grant | Oct. 16, 1934 |
| 2,238,109 | Griesinger | Apr. 15, 1941 |
| 2,261,229 | Cothran | Nov. 4, 1941 |
| 2,321,246 | Porter | June 8, 1943 |
| 2,340,846 | Landes | Feb. 1, 1944 |
| 2,395,025 | Wassell | Feb. 19, 1946 |